United States Patent [19]

Swenson et al.

[11] 4,055,964
[45] Nov. 1, 1977

[54] HEAT PUMP SYSTEM

[75] Inventors: Paul F. Swenson, Cleveland, Ohio; Paul B. Moore, Fedhaven, Fla.

[73] Assignee: Consolidated Natural Gas Service Company, Cleveland, Ohio

[21] Appl. No.: 737,776

[22] Filed: Nov. 1, 1976

[51] Int. Cl.² .............. F25B 27/02; F25B 13/00; F25B 1/00
[52] U.S. Cl. .............................. 62/238; 62/324; 62/501; 165/62
[58] Field of Search ........... 62/160, 324, 238, 501; 165/26, 29, 50, 62

[56] References Cited

U.S. PATENT DOCUMENTS

| | | | |
|---|---|---|---|
| 2,952,138 | 9/1960 | Russell et al. | 62/238 |
| 3,153,442 | 10/1964 | Silvern | 62/238 |
| 3,276,226 | 10/1966 | Osborne | 62/501 |
| 3,301,000 | 1/1967 | Holbay | 62/501 |
| 3,385,348 | 5/1968 | Emburg | 62/501 |
| 3,400,554 | 9/1968 | Dennis et al. | 62/238 |
| 3,487,655 | 1/1970 | Dennis et al. | 62/160 |
| 3,519,065 | 7/1970 | Kitrilakis | 165/26 |
| 3,519,066 | 7/1970 | Anderson | 165/29 |
| 3,803,847 | 4/1974 | McAlister | 62/324 |

Primary Examiner—Lloyd L. King
Attorney, Agent, or Firm—McNenny, Pearne, Gordon, Gail, Dickinson & Schiller

[57] ABSTRACT

An air heating and cooling system for a building includes an expansion type refrigeration circuit and a vapor power circuit. The refrigeration circuit includes two heat exchangers, one of which is communicated with a source of indoor air from the building and the other of which is communicated with a source of air from outside the building. The vapor power circuit includes two heat exchangers, one of which is disposed in series air flow relationship with the indoor refrigeration circuit heat exchanger and the other of which is disposed in series air flow relationship with the outdoor refrigeration circuit heat exchanger. Fans powered by electricity generated by a vapor power circuit alternator circulate indoor air through the two indoor heat exchangers and circulate outside air through the two outdoor heat exchangers. The system is assembled as a single roof top unit, with a vapor power generator and turbine and compressor thermally insulated from the heat exchangers, and with the indoor heat exchangers thermally insulated from the outdoor heat exchangers.

15 Claims, 8 Drawing Figures

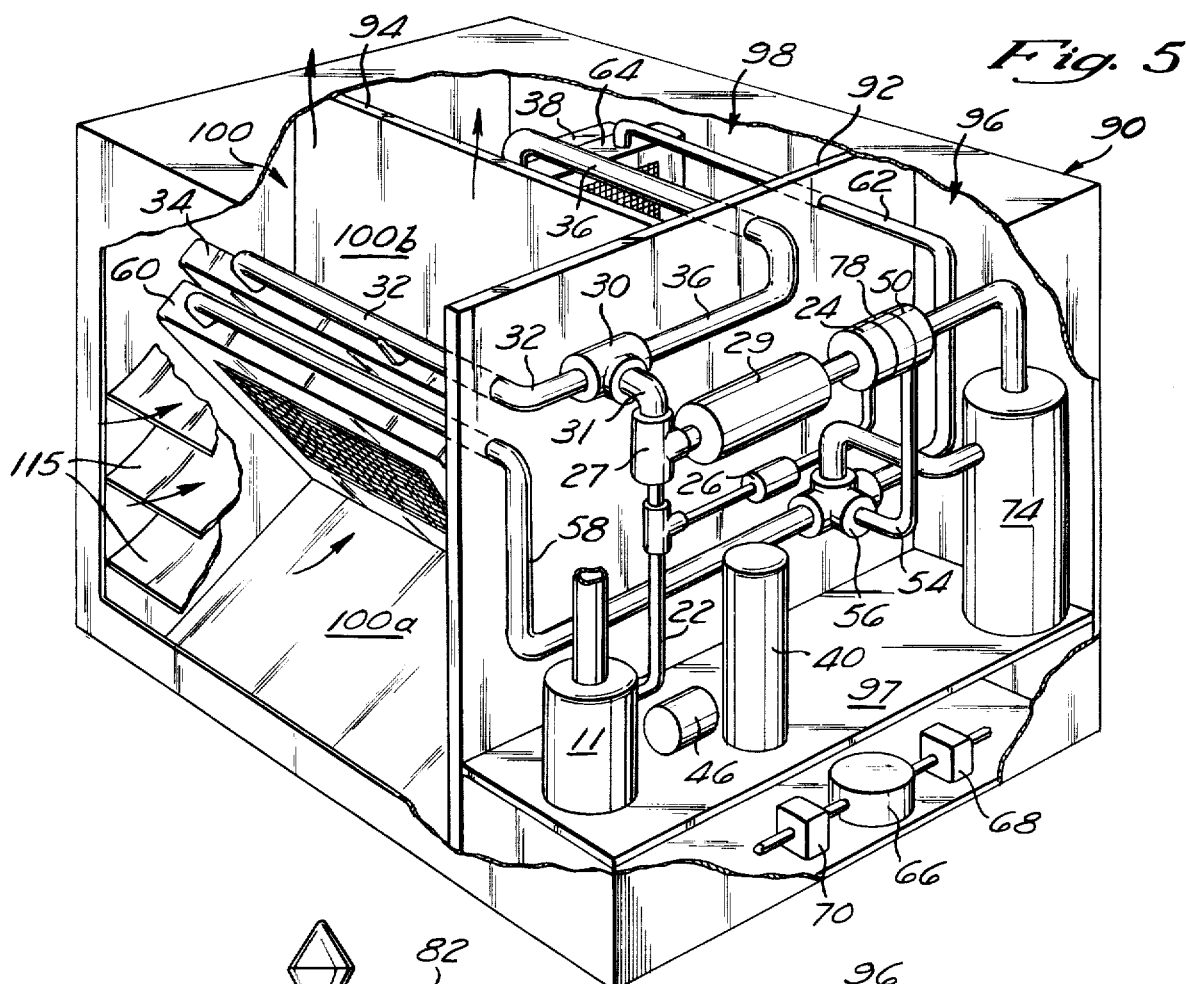
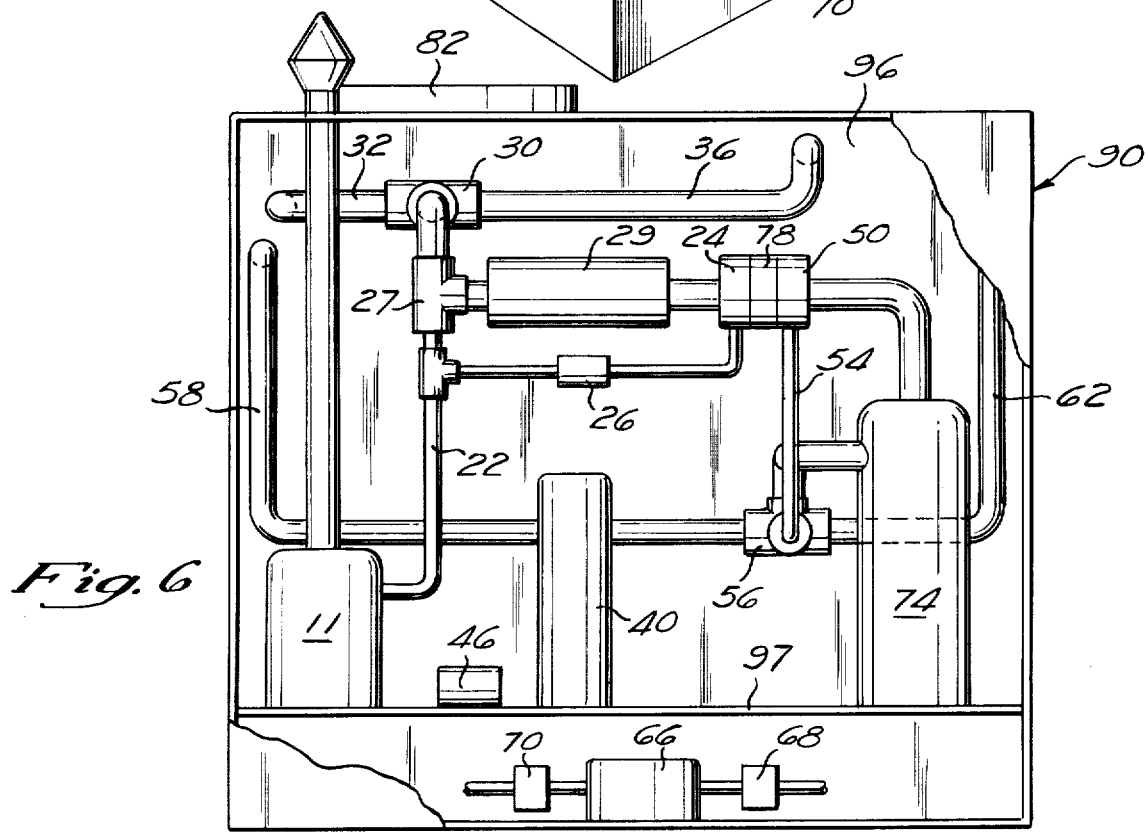

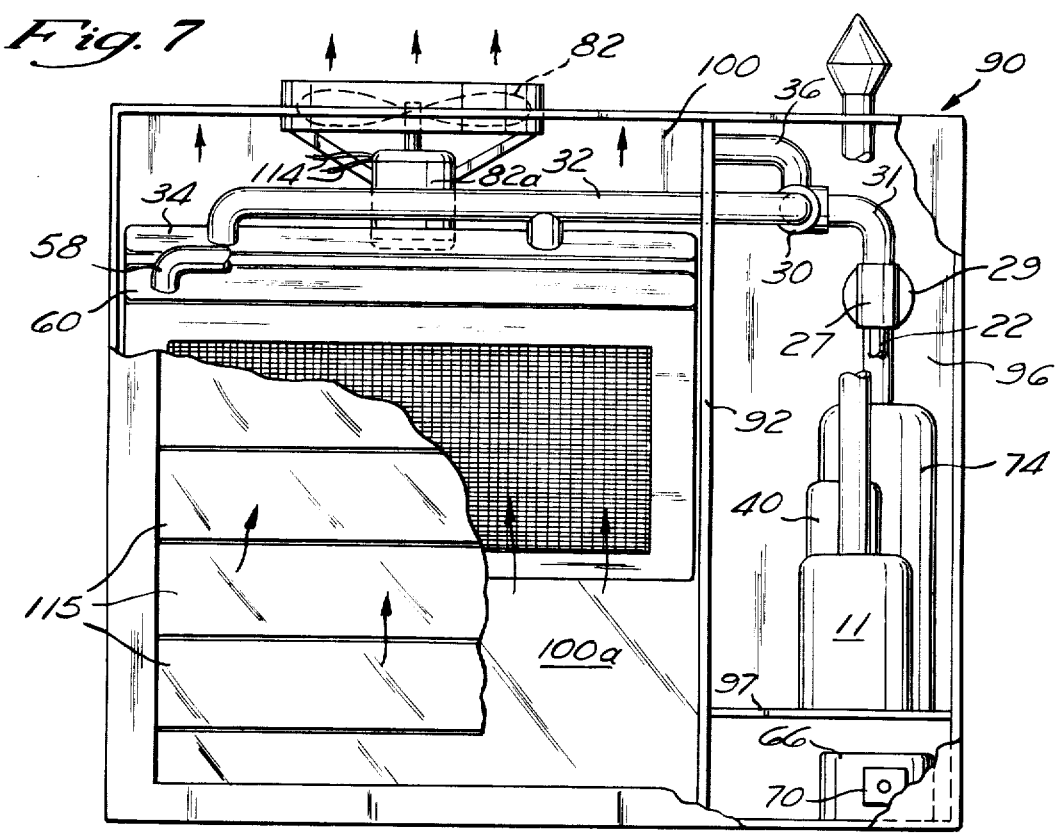
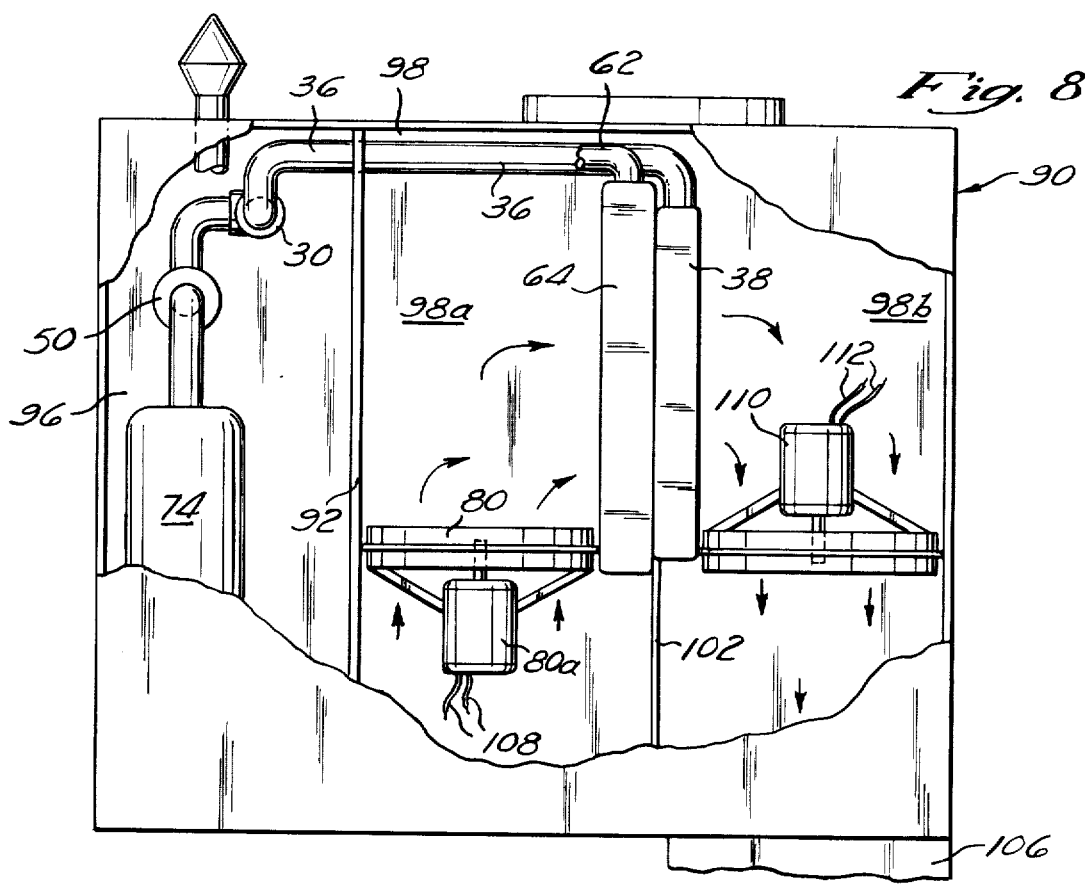

4,055,964

HEAT PUMP SYSTEM

The government of the United States of America has rights in this invention pursuant to Contract Number EY-76-C-02-2883*0000 awarded by the U.S. Energy Research and Development Administration.

BACKGROUND AND SUMMARY OF THE INVENTION

The present invention relates generally to a heating and cooling system, and more particularly to a fuel fired heating and cooling system which is energy efficient on both the cooling mode of operation and the heating mode of operation.

A variety of heat powered heating and cooling systems for buildings has been provided by the prior art. Such systems typically include a vapor power circuit such as a steam power circuit having a prime mover expander such as a turbine. The prime mover expander drives a compressor within a refrigeration circuit which is used as a reversible heat pump for heating and cooling the building.

One such prior art system, as shown in U.S. Pat. No. 3,400,554, utilizes the rejected heat from the vapor power circuit prime mover expander to supplement the heat furnished by the reversible refrigeration circuit when the system is on the heating mode. Another prior art system, as shown in U.S. Pat. No. 3,487,655, utilizes the prime mover expander to drive an alternator which provides electrical power for an electric motor driven compressor and for the associated electric motor driven heat pump fans.

The present invention departs from these and other prior art air heating and cooling systems by providing an air heating and cooling system having series heat exchange for the refrigeration and vapor power circuits both inside the building and outside the building. The system includes an expansion type refrigeration circuit having a compressor, an indoor heat exchanger, and an outdoor heat exchanger. The system also includes a closed vapor power circuit having a vapor generator including a boiler and a superheater, a prime mover expander such as a turbine, an indoor heat exchanger, and an outdoor heat exchanger.

The two series indoor heat exchangers and the two series outdoor heat exchangers are arranged with the refrigeration circuit heat exchangers upstream in the air flow path of the vapor power circuit heat exchangers. A first fan arrangement conducts air across the indoor heat exchangers, and a second fan arrangement conducts air across the outdoor heat exchangers.

When the system is in a heating mode of operation, the indoor refrigeration circuit heat exchanger serves as a condenser to provide one stage of heating for the indoor air, and the indoor vapor power circuit heat exchanger receives the outlet vapor from the prime mover expander to provide a second stage of heating for the indoor air. The outdoor heat exchanger of the vapor power circuit does not receive outlet vapor from the prime mover expander during the heating mode.

When the system is on the cooling mode of operation, the indoor refrigeration circuit heat exchanger serves as an evaporator to cool the indoor air, and outlet vapor from the prime mover expander is directed away from the indoor vapor power circuit heat exchanger. The outdoor refrigeration circuit heat exchanger functions as a condenser, and the outlet vapor from the prime mover expander is conveyed to the outdoor vapor power circuit heat exchanger during the cooling mode.

The prime mover expander also drives an alternator which provides electrical power to the first and second fan arrangements. As the speed of the prime mover expander is increased, the electrical power output of the alternator increases to increase the speed of the fans and thereby increase air flow across both the indoor and outdoor heat exchangers. During very cold weather, vapor from the vapor generator is incrementally injected directly into the indoor vapor power circuit heat exchanger to increase the heating capacity of the system and avoid undesirable compressor operating conditions.

The entire system is assembled in a common housing, and a first insulating wall in the housing thermally insulates the vapor generator and the prime mover expander and the refrigerant compressor from the heat exchangers. A second insulating wall in the housing thermally insulates the series indoor heat exchangers from the series outdoor heat exchangers.

Although the system is described herein with reference to indoor and outdoor air, the system can also be used with indoor and outdoor fluids other than air such as water or brine. Additionally, the indoor and outdoor fluids need not be the same fluid, for example when the indoor fluid is air and the outdoor fluid is ocean brine.

BRIEF DESCRIPTION OF THE DRAWINGS

These and other aspects and advantages of the invention will become apparent upon an understanding of the embodiment of the invention shown in the drawings, wherein:

FIG. 5 is a perspective view of the system shown in FIG. 1, with the water lines of the vapor power circuit and most liquid refrigerant lines omitted for clarity;

FIG. 6 is an end view of the system shown in FIG. 5;

FIG. 7 is a left side view of the system shown in FIG. 5; and

FIG. 8 is a right side view of the system shown in FIG. 5.

DETAILED DESCRIPTION OF THE DRAWINGS

Figure 1:
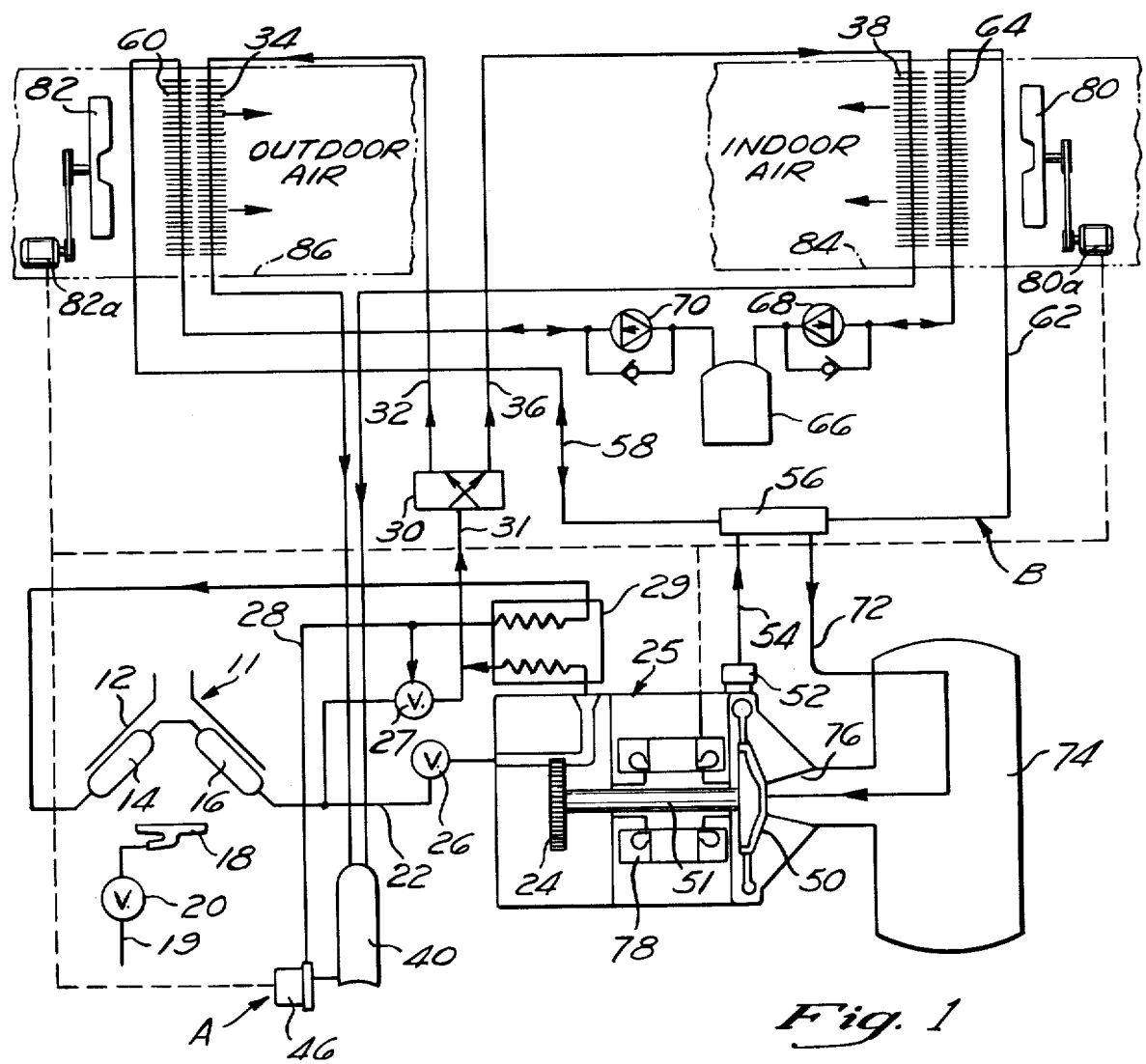
FIG. 1 is a schematic view of a heating and cooling system according to the invention, with the prime mover expander and compressor and alternator shown in cross section.

Referring now to the drawings in greater detail, the disclosed air heating and cooling system includes a closed loop vapor power circuit A and an expansion type refrigeration circuit B.

The vapor power circuit A includes a gas fired vapor generator 11 having an insulated housing 12 with an evaporator section 14 connected in series with a superheater section 16. The gas fired vapor generator 11 includes a burner 18 supplied with natural gas by a supply line 19 which is controlled by a conventional temperature responsive valve 20 regulated in response to the temperature of steam leaving the superheater 16.

The steam leaving the superheater 16 is conducted by a line 22 to an inlet nozzle or nozzles of an axial flow steam turbine 24 of a turbo-generator unit 25. The turbine 24 may alternatively be constructed in any other appropriate manner, such as shown in U.S. Pat. No. 3,400,554, the entirety of which is incorporated herein by reference. Supply of steam to the turbine 24 is controlled by a throttling valve 26. The valve 26 is opened or closed by any suitable means such as a device (not shown) which senses thermostat error and compressor speed and outdoor ambient temperature to maintain a predetermined compressor speed for any given combination of thermostat error and outdoor ambient temperature.

A second throttling valve 27 provides a source of additional heat when required on the heating mode as explained below. The valve 27 also serves as an attemperator, mixing water from a line 28 with the superheated steam from the vapor generator 11 so that the source of additional heat is at a lower temperature and a considerably lower level of superheat than the superheated steam from the vapor generator 11. The valve 27 is proportionally controlled by a device (not shown) which senses thermostat error and compressor speed. The valve 27 is arranged to supply the proper amount of additional heat that is required when maximum desirable compressor speed has already been reached as explained below.

The exhaust steam from the prime mover expander or turbine 24 passes through a regenerator 29 which preheats the water entering the vapor generator 11 as explained below. Exhaust steam from the regenerator 29 is then carried by a line 31 to a bidirectional valve 30. The bidirectional valve 30 is arranged to direct the exhaust steam through a line 32 to an outdoor heat exchanger 34, or alternatively through a line 36 to an indoor heat exchanger 38. The heat exchangers 34 and 38 are air cooled and are sized so that either heat exchanger by itself has sufficient capacity to function as the condenser for the maximum output of the vapor power circuit A. The construction of the heat exchangers 34 and 38 is further discussed below.

The condensate from the heat exchangers 34 and 38 is directed to a standpipe 40 which in turn is connected to a feed pump 46. The feed pump 46 is an electric motor-driven pump whose speed is matched to the requirements of the entire system as described more fully below. The pump 46 completes the vapor power circuit by pumping the condensate from the standpipe 40 through the regenerator 29 to the vapor generator 11. The pump 46 also provides condensate to the valve 27 as needed, as discussed above. The entire vapor power circuit A is hermetically sealed to eliminate the need for make-up water in the system. The pressure within the vapor generator 11 acts upon the feed pump 46 to control the discharge rate of the feed pump 46 and hence control the pressure in line 22.

The closed loop refrigeration circuit B includes a high speed centrifugal compressor 50 which is drivingly connected to the turbine 24 by a suitable drive shaft 51. The compressor 50 has an outlet 52 which is connected through a line 54 to a mode valve 56. The valve 56 selectively directs the output from the compressor 50 through a line 58 to an outdoor heat exchanger 60 or alternatively through a line 62 to an indoor heat exchanger 64. The heat exchangers 60 and 64 are air cooled and are sized so that either heat exchanger has sufficient capacity to function as the evaporator or as the condenser for the refrigeration circuit B. The construction of the heat exchangers 60 and 64 is further discussed below.

When the outdoor heat exchanger 60 receives the output from the compressor 50 and functions as a condenser, the heat exchanger 60 has its outlet connected through a liquid accumulator 66 and expansion valve 68 to the indoor heat exchanger 64 which then serves as an evaporator. Similarly, when the output from the compressor 50 is connected directly to the indoor heat exchanger 64 so that the indoor heat exchanger 64 functions as the condenser, the outlet of the heat exchanger 64 is connected through the liquid accumulator 66 and expansion valve 70 to the heat exchanger 60 which then serves as the evaporator. The outlet from the evaporator is then connected through a line 72 and a surge tank 74 to the inlet 76 of the compressor 50. The fluid used in the refrigeration circuit B is preferably a relatively commonly used commercially available fluid, such as a fluid of the halocarbon family.

The turbo-compressor unit 25 also includes an alternator 78 disposed along the drive shaft 51 between the turbine 24 and the compressor 50. The electrical output from the alternator 78 is electrically connected to an indoor electric motor driven fan arrangment 80 which includes an electric motor 80a and which provides air flow across the indoor heat exchangers 64 and 38, and to an outdoor electric motor driven fan arrangement 82 which includes an electric motor 82a and which provides air flow across the outdoor heat exchangers 60 and 34, and to the electric motor driven condensate pump 46. In this manner, the speed of the fan arrangements 80 and 82 is matched to the speed of the turbine 24 and compressor 50. This insures that the fan arrangements 80 and 82 operate at lower speeds when the turbine 24 and compressor 50 operate at lower speeds, and that the fan arrangements 80 and 82 operate at higher speeds when the turbine 24 and compressor 50 operate at higher speeds.

The reference herein to the heat exchangers 38 and 64 as being indoor heat exchangers means that they are disposed in a duct or passage 84 through which fluid is circulated to and from the inside of a building by operation of the fluid moving arrangement 80 in the direction indicated by the arrow in the duct 84. Similarly, the reference herein to the heat exchangers 34 and 60 as being outdoor heat exchangers means that they are disposed in a duct or passage 86 through which fluid from outside of the building circulates by operation of the fluid moving arrangement 82 in the direction indicated by the arrow in the duct 86. The fan arrangements 80 and 82 are further discussed below with reference to FIGS. 5 through 8.

The air heating and cooling system shown in FIG. 1 is placed in the cooling mode of operation by moving the valve 30 to a position connecting the outlet of the steam turbine 24 to the line 32 and outside heat exchanger 34, and discontinuing flow of vapor from the outlet of the steam turbine 24 to the inside heat exchanger 38. The valve 56 is moved to a position connecting the outlet line 54 from the compressor outlet 52 to the line 58 leading to the outdoor heat exchanger 60, and connecting the line 62 leading from the indoor heat exchanger 64 to the line 72 leading to the compressor inlet 76. With the valves 30 and 56 in this position, the outdoor vapor power circuit heat exchanger 34 condenses the rejected vapor from the steam turbine 24. The indoor refrigeration circuit heat exchanger 38 serves as an evaporator, and the outdoor refrigeration circuit heat exchanger 60 serves as a condenser for the refrigeration circuit B.

During this cooling mode of operation, the outdoor air flows in series first through the refrigeration circuit heat exchanger 60 and then through the vapor power circuit heat exchanger 34. The refrigeration circuit condenser 60 is arranged to operate at a lower temperature than the vapor power circuit condenser 34, hence outside air flowing through the outdoor heat exchangers is progressively heated first by the refrigeration circuit heat exchanger 60 and then by the vapor power circuit heat exchanger 34. In this manner, the single fan arrangement 82 provides air flow through both the refrigeration circuit condenser and the vapor power circuit condenser when the air heating and cooling system is on the cooling mode. On the cooling mode, this series arrangement of the outdoor heat exchangers increases the coefficient of performance of the system (the ratio of the heating or cooling effect achieved to the energy consumed by the system for a given total heat exchanger face area perpendicular to outdoor air flow and a given heat exchanger bulk and weight and a given amount of power for moving the outdoor air). This is because the face area of the outdoor heat exchangers perpendicular to the outdoor air flow is maximized by this arrangement and the operating temperature of the upstream refrigeration circuit heat exchanger 60 is minimized to cause a reduction in compressor work which more than compensates for the resulting increase in backpressure imposed upon the turbine 24 and for the additional pressure drop imposed in the air flow by the downstream heat exchanger 38.

Although in the above description of the system on the cooling mode of operation it is assumed that the flow of vapor from the outlet of the steam turbine 24 to the inside heat exchanger 38 is fully discontinued, such flow may alternatively be only partially discontinued by operation of the valve 30 so that a small amount of vapor still flows to the inside heat exchanger 38. This could be done when it is desired to use the system to dehumidify the air inside the building without lowering the temperature of the air. Under these conditions of operation, the series air flow relationship of the inside heat exchangers advantageously permits the air to be dehumidified by the heat exchanger 64 and then permits the dehumidified air to be warmed to the desired temperature by the heat exchanger 38.

When the system shown in the drawings is placed in the heating mode of operation, the valve 30 is moved to a position directing outlet vapor or rejected heat from the steam turbine 24 to the indoor heat exchanger 38 and discontinuing flow of outlet vapor from the steam turbine 24 to the outdoor heat exchanger 34. The valve 56 is moved to a position connecting the compressor outlet 52 to the indoor heat exchanger 64 and connecting the line 58 from the outdoor heat exchanger 60 to the line 72 leading to the compressor inlet 76. Under these conditions, the indoor refrigeration circuit heat exchanger 64 functions as a condenser and the outdoor refrigeration circuit heat exchanger 60 functions as the evaporator.

During the heating mode, the fan arrangement 80 circulates return air from the building first across the refrigeration circuit heat exchanger 64 and then across the vapor power circuit heat exchanger 38. The refrigeration circuit heat exchanger 64 provides a first increase in temperature of the building air and the vapor power circuit heat exchanger 38 provides a second increase in temperature of the building air so that the heated air supplied to the building is at a temperature of approximately 120° Fahrenheit. This provides a series heat exchange for the indoor air so that the indoor air is progressively heated first by the pumped heat from the refrigeration circuit B and then by rejected heat from the vapor power circuit A.

Figure 2:
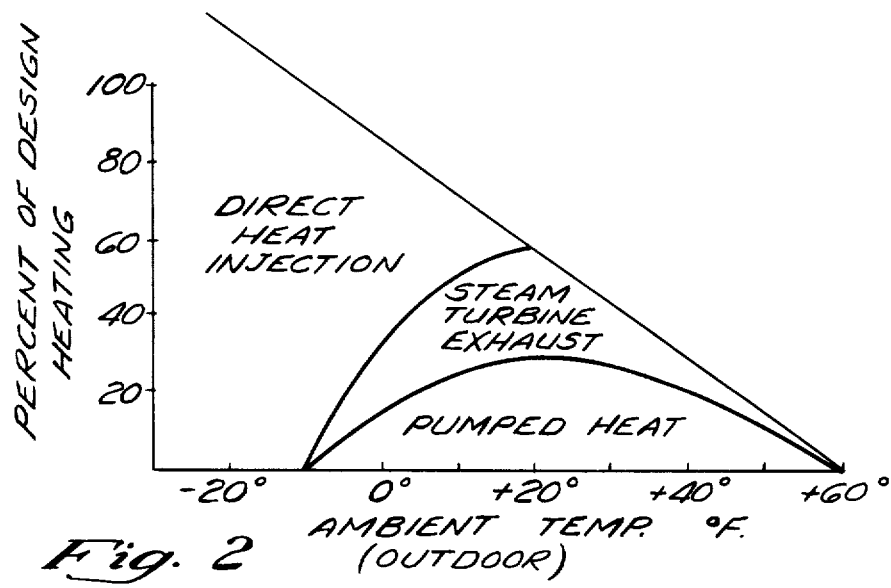
FIG. 2 is a graph showing the source of heat for the indoor air at various outdoor ambient temperatures, when the system shown in FIG. 1 is on the heating mode.

This series heat exchange on the heating mode is illustrated in the graph of FIG. 2, which shows the percentage contribution of the pumped heat and of the vapor power circuit heat for various ambient or outdoor temperatures. As shown in the graph of FIG. 2, the pumped heat and the steam turbine exhaust heat are sufficient to heat the building in which the system is used at ambient temperatures above 20° F. At ambient temperatures less than 20° F, the pumped heat and the steam turbine exhaust do not provide sufficient heat to heat the building. This condition at which the pumped heat and the steam turbine exhaust heat are not sufficient to provide the desired heating of the building is determined by a proportional control thermostat (not shown) when the building air is not maintained at the desired temperature. When this occurs, the thermostat opens the valve 27 the necessary amount to inject steam from the line 22 into the line 31 leading to the indoor heat exchanger 38.

As the ambient temperature decreases further below 20° F, the amount of pumped heat available decreases and the amount of heat available from the steam turbine exhaust also decreases as shown in FIG. 2. As this occurs, the amount of heat provided by the direct steam injection from the vapor generator 11 through the valve 27 increases until an ambient temperature of $-10°$ F. is reached. At this temperature, the refrigeration circuit B is no longer capable of absorbing heat from the outdoor air and transferring it to the indoor air. Under these conditions, the entire heating load of the building is met by direct injection of heat from the vapor generator 11 into the heat exchanger 38.

Figure 3:
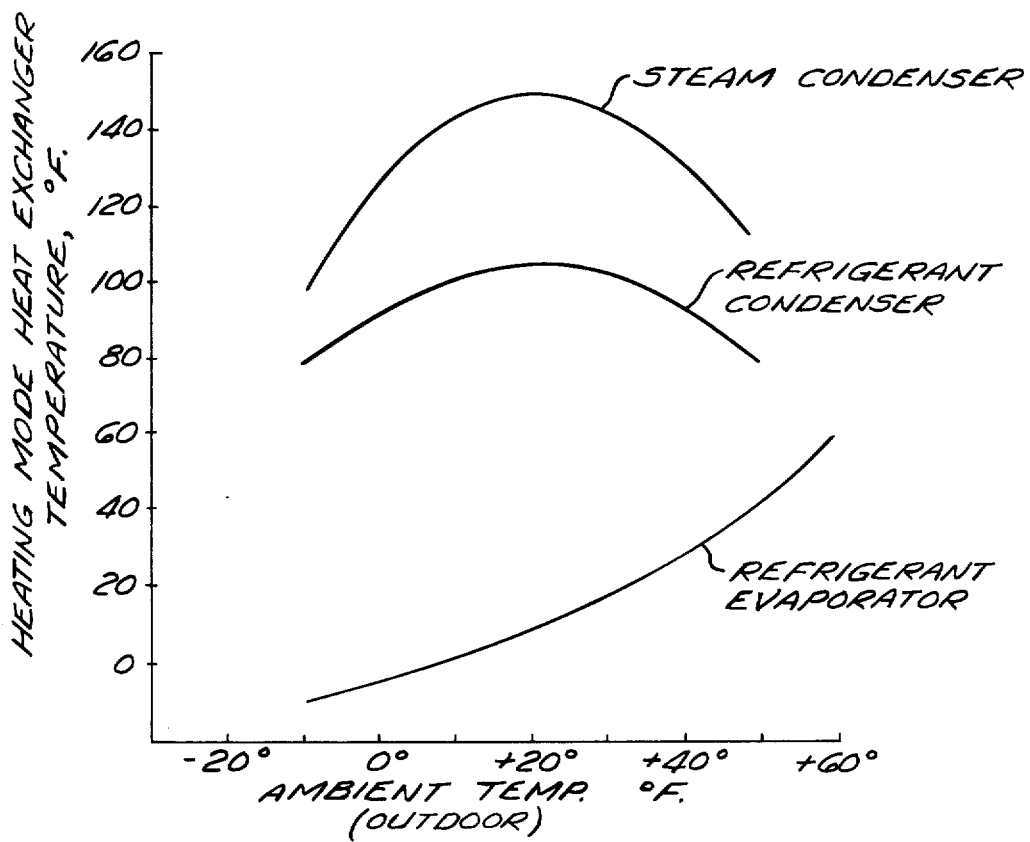
FIG. 3 is a graph showing the indoor and outdoor heat exchanger temperatures at various outdoor ambient temperatures, when the system shown in FIG. 1 is on the heating mode.

Referring now to FIG. 3, the heat exchanger temperatures of the three active heat exchangers on the heating mode of operation when the heat pump is operating are illustrated. As shown in FIG. 3, the outdoor refrigeration circuit heat exchanger 60, which is the evaporator on the heating mode, operates at a temperature slightly below ambient temperature so that the refrigerant absorbs heat from the outdoor air. The indoor refrigeration circuit heat exchanger 64, which functions as the condenser on the heating mode of operation, operates at temperatures below the operating temperature of the vapor power circuit condenser 38. This difference in operating temperatures of the indoor heat exchangers 64 and 38 provides the above described stepped series heat exchange for the indoor air of the building during the heating mode of operation.

This series arrangement of the indoor heat exchangers increases the coefficient of performance of the system on the heating mode. This is because the face area of the indoor heat exchangers perpendicular to the indoor air flow is maximized by this arrangement, and the operating temperature of the upstream refrigeration circuit heat exchanger 64 is minimized to cause a reduction in compressor work and to permit the heat pump to pump heat at lower outdoor ambient temperatures. Additionally, this is accomplished without necessitating a different indoor air flow path on the heating mode than on the cooling mode.

Figure 4:
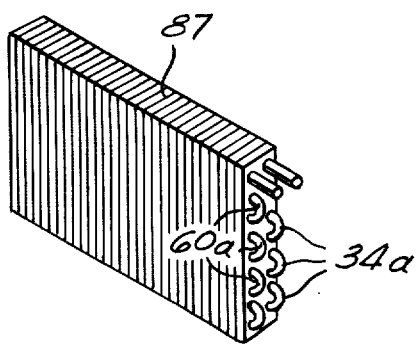
FIG. 4 is a perspective view of an alternate arrangement for the outdoor heat exchangers of the system shown in FIG. 1.

In an alternate arrangement for the two outdoor heat exchangers 60 and 34, the two separate heat exchangers 60 and 34 are replaced with a single thermally coupled unit shown in FIG. 4. This thermally coupled unit includes a row of tubes 60a for the refrigeration circuit outdoor heat exchanger and a separate row of tubes 34a for the vapor power circuit outdoor heat exchanger 34. The unit also includes a single fin bank 87 which is shared by the two rows of outdoor heat exchanger tubes 60a and 34a.

When this alternate outdoor heat exchanger arrangement is used and the system is on the heating mode, the outdoor vapor power circuit heat exchanger tubes 34a do not receive rejected heat from the turbine 24, while the outdoor refrigeration circuit heat exchanger tubes 60a function as the evaporator to absorb heat from the outside air. During this mode of operation, the entire area of the single fin bank 87 for the thermally coupled unit is available to the refrigeration circuit, and the fin area normally commited to the vapor power circuit is available to the refrigeration circuit heat exchanger tubes 60a. In this manner, the outdoor refrigeration circuit heat exchanger tubes 60a of this alternate embodiment can take advantage of an increase in effective fin area when the system is on the heating mode of operation. This is particularly advantageous, since the refrigeration circuit evaporator in the heating mode has a relatively high surface area requirement in the disclosed air heating and cooling system.

Referring now to FIG. 5, the air heating and cooling system of FIG. 1 is shown assembled as a single unit in a single housing 90. The walls of the housing 90, including both the interior walls and the exterior walls shown in FIG. 5, are all thermally insulating walls of identical construction. This construction is a sandwich construction (not shown) which includes one layer of rigid sheet metal, a layer of fiberglass insulation, and a thin layer of metal foil covering the fiberglass insulation. A supporting frame (not shown) for the housing 90 is also provided.

The interior of the housing 90 is provided with a first thermal insulation wall 92 and a second thermal insulation wall 94 arranged in a T-shaped configuration. The walls 92 and 94 are flat and extend from the top to the bottom of the housing 90 to divide the housing 90 into a first chamber 96, a second chamber 98, and a third chamber 100. The chamgers 96, 98 and 100 are thus thermally insulated from one another by the T-shaped configuration of the insulation walls 92 and 94. The chambers 96 and 100 provide the ducts 84 and 86, respectively, shown in FIG. 1.

As shown in FIGS. 5 and 6, the vapor generator 11 and turbine 24 and compressor 50 are all disposed in the first chamber 96. The mode valves 30 and 56 are also disposed in the first chamber 96. This arrangement permits all moving parts of the system except the fans to be readily accessible in the first chamber 96 for maintenance purposes. Additionally, this arrangement provides freeze protection for the water in the system, since the components of the system which handle water (other than the hot water return line from the heat exchanger 34) are encased within the thermally insulated walls of the chamber 96 with the vapor generator 11.

A horizontal shelf 97 divides the first chamber 96 into upper and lower compartments which are not thermally insulated from one another, with the liquid accumulator 66 and expansion valves 68 and 70 arranged in the lower compartment. This arrangement is not necessary to the system but enables the component parts of the system in the first chamber 96 to be spaced further apart.

Referring now to FIGS. 5 and 8 together, the refrigeration circuit indoor heat exchanger 64 and the vapor power circuit indoor heat exchanger 38 are disposed in the second chamber 98. The heat exchangers 38 and 64 and a sheet metal partition 102 divide the second chamber 98 into compartments 98a and 98b. the bottom of each of the compartments 98a and 98b is open so that the compartment 98a can receive return air from the building while the compartment 98b can supply conditioned air to a supply duct 106 leading to the building interior.

The indoor fan 80, which is supplied with electrical power through the lines 108 from the alternator 78, is dimensioned and arranged to be of sufficient capacity to maintain a predetermined air flow rate through the heat exchangers 64 and 38 for any given speed of the turbine 24. The indoor fan 80 is not of sufficient capacity, however, to maintain the predetermined air flow from the compartment 98b through the supply duct 106 to the building. Because the length of the supply duct 106 will depend upon the particular building in which the unit is used, this permits the alternator 78 and turbine 24 and indoor fan 80 to be designed so that they are suitable for any building in which the unit is used. A third fan 100 is then selected, depending upon the size and length of the duct 106, to provide the desired air flow rate from the compartment 98b through the duct 106 to the building. The third fan 100 is electrically isolated from the generator 78 and is supplied with electrical power from an alternate source of electricity such as the externally supplied utility electricity from the building through the electrical lines 112. By this arrangement, in the event the turbine 24 or compressor 50 fails, the system will still provide heat for the building since the valve 27 (FIG. 5) can be opened to provide direct steam injection into the heat exchanger 38, and the third fan 110 will supply heated air to the building at a reduced capacity.

Referring now to FIGS. 5 and 7 together, the outdoor heat exchangers 60 and 34 are arranged in the third chamber 100 to divide the third chamber 100 into an inlet compartment 100a and an outlet compartment 100b. The outdoor fan 82, which is powered by electricity through lines 114 from the alternator 78, is dimensioned and arranged to provide a proper air flow across the heat exchangers 60 and 34 for any given speed of the turbine 24. The outdoor fan 82 pulls outside air through louvers 115 into the inlet chamber 100a. The oudoor air then flows across the heat exchangers 60 and 34 and exits through the blades of the outdoor fan 82 in the direction of the arrows shown in FIGS. 5 and 7.

What is claimed is:
1. A fluid heating and cooling system comprising:
   a refrigeration circuit having a compressor with an inlet and an outlet, an indoor refrigeration circuit heat exchanger, and an outdoor refrigeration circuit heat exchanger,
   a vapor power circuit having a vapor generator with an inlet and an outlet, a prime mover expander having an inlet and an outlet, means connecting said vapor generator outlet with said prime mover expander inlet, an indoor vapor power circuit heat exchanger, an outdoor vapor power circuit heat exchanger, first fluid moving means for conducting a first fluid in series across both of said indoor heat exchangers, second fluid moving means for conducting a second fluid in series across both of said outdoor heat exchangers, means for drivingly interconnecting said prime mover expander with said compressor, first valve means movable to a cooling position for discontinuing flow of vapor from said prime mover expander outlet to said vapor power circuit indoor heat exchanger when said prime mover expander is drivingly connected to said compressor, second valve means movable to a heating position for discontinuing flow of vapor from said prime mover expander outlet to said vapor power circuit outdoor heat exchanger when said prime mover expander is drivingly connected to said compressor, third valve means movable to a cooling position for connecting said compressor outlet to said refrigeration circuit outdoor heat exchanger when said first valve means is in said cooling position, fourth valve means movable to a heating position for connecting said compressor outlet to said refrigeration circuit indoor heat exchanger when said second valve means is in said heating position.

2. A fluid heating and cooling system as set forth in claim 1, including fifth valve means for connecting said vapor generator outlet side to said vapor power circuit indoor heat exchanger when said first valve means is in said heating position.

3. A fluid heating and cooling system as set forth in claim 1, said vapor power circuit indoor heat exchanger being disposed downstream in the fluid flow from said refrigeration circuit indoor heat exchanger under all conditions of heating and cooling, and said vapor power circuit outdoor heat exchanger being disposed downstream in the fluid flow from said refrigeration circuit outdoor heat exchanger under all conditions of heating and cooling.

4. A fluid heating and cooling system as set forth in claim 3, including first duct means defining a first series fluid flow path across both of said indoor heat exchangers, and second duct means defining a second series fluid flow path across both of said outdoor heat exchangers.

5. A fluid heating and cooling system as set forth in claim 1, wherein said refrigeration circuit outdoor heat exchanger and said vapor power circuit outdoor heat exchanger include at least one bank of fins common to both of said outdoor heat exchangers.

6. In a building having an inside and an outside, an air heating and cooling system comprising:

an expansion type refrigeration circuit having a compressor with an inlet and an outlet, an indoor refrigeration circuit heat exchanger, an outdoor refrigeration circuit heat exchanger, and conduit means connecting said compressor outlet with each of said refrigeration circuit indoor and outdoor heat exchangers, a vapor power circuit having a vapor generator with an inlet and an outlet, a prime mover expander having an inlet and an outlet, conduit means connecting said vapor generator outlet with said prime mover expander inlet, a vapor power circuit indoor heat exchanger, a vapor power circuit outdoor heat exchanger, conduit means connecting said prime mover expander outlet with each of said vapor power circuit indoor and outdoor heat exchangers, first air moving means conducting air from inside said building in series across both of said indoor heat exchangers, second air moving means conducting air from outside said building in series across both of said outdoor heat exchangers, means drivingly interconnecting said prime mover expander with said compressor, first valve means movable to a cooling position for discontinuing flow of vapor from said prime mover expander outlet to said vapor power circuit indoor heat exchanger when said prime mover expander is drivingly connected to said compressor, second valve means movable to a heating position for discontinuing flow of vapor from said prime mover expander outlet to said vapor power circuit outdoor heat exchanger when said prime mover expander is drivingly connected to said compressor, third valve means movable to a cooling position for connecting said compressor outlet to said refrigeration circuit outdoor heat exchanger when said first valve means is in said cooling position, fourth valve means movable to a heating position for connecting said compressor outlet to said refrigeration circuit indoor heat exchanger when said second valve means is in said heating position.

7. An air heating and cooling system as set forth in claim 6, said refrigeration circuit and vapor power circuit being disposed in a common housing, and said housing being disposed outside said building.

8. An air heating and cooling system as set forth in claim 7, said housing including first duct means defining a first air flow path across said indoor heat exchangers and second duct means defining a second air flow path across said outdoor heat exchangers, said first fan means being disposed in said first duct means and said second fan means being disposed in said second duct means, said vapor power circuit indoor heat exchanger being disposed adjacent to and downstream in said first duct means from said refrigeration circuit indoor heat exchanger, and said vapor power circuit outdoor heat exchanger being disposed adjacent to and downstream in said second duct means from said refrigeration circuit outdoor heat exchanger.

9. An air heating and cooling system as set forth in claim 8, said vapor power circuit including electricity generating means, means drivingly interconnecting said prime mover and said generating means, and means electrically connecting said generating means with said first and second air moving means.

10. An air heating and cooling system as set forth in claim 9, third duct means defining an air flow path from said first duct means to a location of final delivery in said building, said first air moving means being of sufficient air moving capacity to maintain a predetermined air flow rate across said indoor heat exchangers and being of insufficient capacity to also maintain said predetermined air flow rate through said third duct means, third air moving means conducting air through said third duct means, said third air moving means being of sufficient air moving capacity to maintain a predetermined air flow rate through said third duct means, and said third air moving means being electrically isolated from said generating means.

11. An air heating and cooling system comprising:

a refrigeration circuit having a compressor with an inlet and an outlet, an indoor refrigeration circuit heat exchanger, and an outdoor refrigeration circuit heat exchanger, a vapor-power circuit having a vapor generator with an inlet and an outlet, a prime mover expander having an inlet and an outlet, means connecting said vapor generator outlet with said prime mover expander inlet, an indoor vapor-power circuit heat exchanger, an outdoor vapor-power circuit heat exchanger, first air moving means for conducting air in series across both of said indoor heat exchangers, second air moving means for conducting air in series across both of said outdoor heat exchangers, means drivingly interconnecting said prime mover expander with said compressor, first valve means movable to a cooling position for discontinuing flow of vapor from said prime mover expander outlet to said vapor-power circuit indoor heat exchanger when said prime mover expander is drivingly connected to said compressor, second valve means movable to a heating position for discontinuing flow of vapor from said prime mover expander outlet to said vapor-power circuit outdoor heat exchanger when said prime mover expander is drivingly connected to said compressor, third valve means movable to a cooling position for connecting said compressor outlet to said refrigeration circuit outdoor heat exchanger when said first valve means is in said cooling position, fourth valve means movable to a heating position for connecting said compressor outlet to said refrigeration circuit indoor heat exchanger when said second valve means is in said heating position, said refrigeration circuit and said vapor-power circuit being disposed in a housing, said housing having a first thermal insulation wall separating said heat exchangers from said compressor and vapor generator and prime mover expander, and said housing having a second thermal insulation wall separating said indoor heat exchangers from said outdoor heat exchangers.

12. An air heating and cooling system as set forth in claim 11, said first and second thermal insulation walls being arranged in a T configuration, and said second thermal insulation wall forming the stem of the T.

13. An air heating and cooling system as set forth in claim 11, said first wall defining a first chamber in said housing, said compressor and vapor generator and prime mover expander being disposed in said first chamber, said first and second walls cooperatively defining a second chamber in said housing adjacent said first chamber, said indoor refrigeration circuit heat exchanger and said indoor vapor power circuit heat exchanger both being disposed in said second chamber, said first and second walls cooperatively defining a third chamber in said housing adjacent said first and second chambers, said outdoor refrigeration circuit heat exchanger and said outdoor vapor power circuit heat exchanger both being disposed in said third chamber.

14. An air heating and cooling system as set forth in claim 13, said refrigeration circuit including conduit means extending between said compressor in said first chamber and said refrigeration heat exchangers in said second and third chambers, and said vapor power circuit including conduit means extending between said prime mover expander in said first chamber and said vapor power circuit heat exchangers in said second and third chambers.

15. An air heating and cooling system as set forth in claim 13, said first and second and third and fourth valve means each being disposed in said first chamber.

* * * * *